Feb. 25, 1969  J. J. FEHER  3,429,171
RADIUS SPIN DRILL

Filed Oct. 21, 1965  Sheet 1 of 2

Joseph J. Feher
INVENTOR.

BY *Clarence A. O'Brien*
*and Harvey B. Jacobson*
Attorneys

Feb. 25, 1969  J. J. FEHER  3,429,171
RADIUS SPIN DRILL
Filed Oct. 21, 1965
Sheet 2 of 2
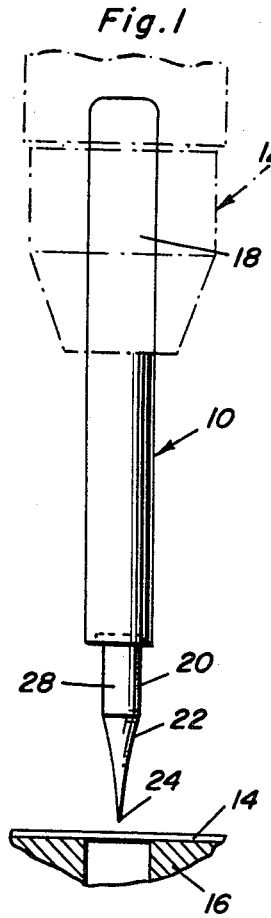
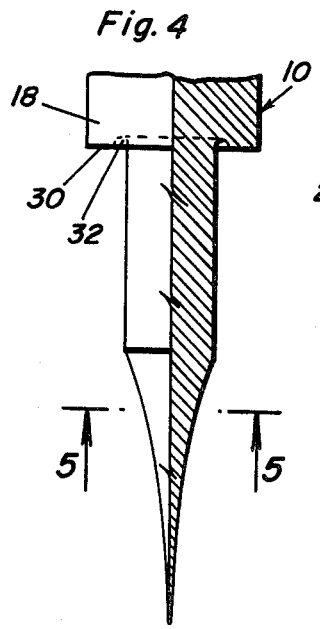
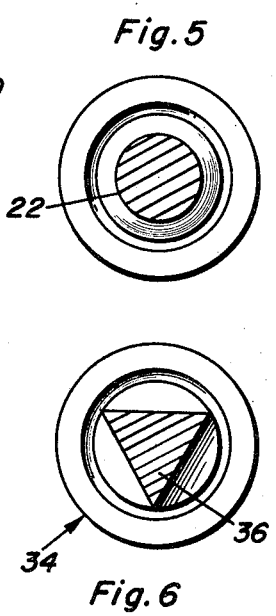
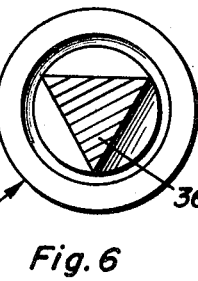
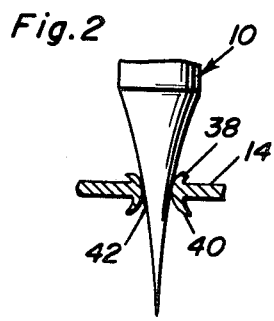
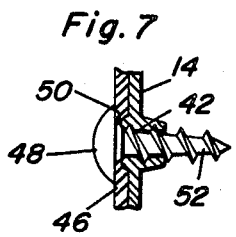
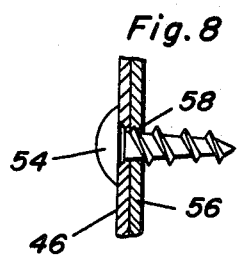
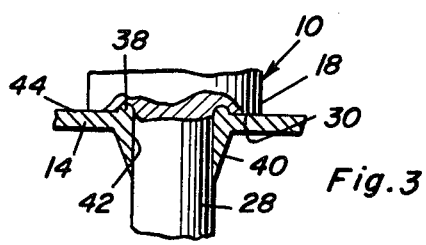
Joseph J. Feher
INVENTOR.
BY *Clarence A. O'Brien*
*and Harvey B. Jacobson*
Attorneys United States Patent Office 3,429,171
Patented Feb. 25, 1969

3,429,171
RADIUS SPIN DRILL
Joseph J. Feher, 128 Riverside Drive N.,
Bricktown, N.J. 08723
Filed Oct. 21, 1965, Ser. No. 499,938
U.S. Cl. 72—325                 17 Claims
Int. Cl. B21d 31/02; B21b 1/00, 3/00

ABSTRACT OF THE DISCLOSURE

A sheet metal piercing and extruding member defining an elongated shank member adapted to be supported and driven at one end by a rotary member and including a second work-engaging end portion provided with a terminal end portion gradually tapering in diameter toward its free terminal end, the cross-sectional shape of the tapering end portion being circular throughout its length and therefore completely free of cutting edges adapted to remove material from a sheet of material through which the tapering end portion is being advanced during rotation of the shank member.

---

This invention relates to a novel and useful drill and more specifically to a shank-type drill having one end adapted to be engaged in and by a chuck mounted on a driven shaft for rotation of the shank-type drill by the driven shaft. The end of the shank-type drill remote from the end thereof adapted to be engaged in and by a chuck gradually tapers to a sharp point and the tapering portion of the drill is of substantially constant cross-sectional shape throughout its length and is free of cutting edges adapted to remove material from a sheet of material through which the tapreing end portion of the shank-type drill is being advanced during rotation of the drill.

By this construction the pointed end of the drill may, while being rotated about its longitudinal axis, be advanced against a sheet of relatively soft metal such as aluminum. Continued rotation of the drill and axial pressure thereon to force the point of the drill through the sheet metal results in the point of the drill piercing the sheet metal to form an aperture therethrough with the material of the sheet metal previously disposed in the area of the sheet through which the aperture is formed being forced laterally outwardly of the sheet of metal from both sides thereof so as to axially elongate the aperture formed through the sheet metal to an extent wherein the ultimate aperture or bore formed through the sheet metal has a length greater than twice the thickness of the sheet metal. By forming apertures in sheet metal in this manner sheet metal screws subsequently engaged with the sheet material by being threadedly engaged with the material of the sheet metal defining the aperture and disposed thereabout are threadedly engaged with the sheet metal throughout a greater portion of their length thereby proportionally increasing the grip which is afforded by the sheet metal screw or fastener on the sheet metal.

The main object of this invention is to provide an improved drill for forming apertures in relatively soft sheet metal in a manner such that the resultant aperture is appreciably elongated beyond the thickness of the sheet material in which the aperture is formed.

Another object of this invention is to provide an improved drill in accordance with the immediately preceding object and including means by which the material laterally outwardly displaced from the area of the sheet metal in which the aperture is formed by the drill of the instant invention may be somewhat compacted and thus rendered more dense so as to still further increase the securement of a sheet metal fastener on the sheet metal in which the aperture is formed.

Still another object of this invention is to provide an improved drill for forming large diameter apertures in relatively soft sheet metal and also to enlarge existing apertures in sheet metal in a manner such that the enlarged aperture is appreciably elongated beyond the thickness of the sheet material in which the enlarged aperture is formed.

A further object of this invention is to provide an improved drill in accordance with the above main object and including means by which the elongated aperture formed by the drill may be threaded during the aperture forming operation of the drill.

Another object of this invention is to provide an improved drill in accordance with the immediately preceding object and constructed in a manner whereby it is adapted to form large apertures in sheet material as well as to enlarge existing apertures formed in sheet material.

A still further object of this invention is to provide an improved drill in accordance with the immediately preceding object and including means for initially forming the aperture which is to be enlarged during a single operation of the drill.

Still another object of this invention is to provide an improved threaded sheet metal fastener of the sheet metal screw-type and constructed in accordance with the present invention so as to be adapted to form the aperture in sheet material in which the fastener is to be secured.

A final object of this invention to be specifically enumerated herein is to provide an improved drill in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the improved drill of the instant invention with a driving chuck therefor illustrated in phantom lines and the drill positioned above a section of sheet metal suitably backed by means of an apertured support;

FIGURES 2 and 3 are fragmentary side elevational views of the improved drill on somewhat of an enlarged scale illustrating sequential positions of the improved drill while forming an aperture in a section of sheet metal;

FIGURE 4 is a fragmentary enlarged side elevational view of the improved drill with the portion of the drill disposed on one side of a plane passing through the longitudinal centerline thereof illustrated in vertical section;

FIGURE 5 is an enlarged fragmentary horizontal sectional view taken substantially upon the plane indicated by the section line 5—5 of FIGURE 4;

FIGURE 6 is an enlarged fragmentary horizontal sectional view similar to that of FIGURE 5 but illustrating the cross-sectional shape of a modified form of improved drill;

FIGURE 7 is a fragmentary vertical sectional view taken through a section of sheet metal having an aperture formed therethrough in accordance with the present invention and shown with a sheet metal fastener securing a second section of sheet material to the first-mentioned sheet of material;

FIGURE 8 is a fragmentary vertical sectional view similar to that of FIGURE 7 but illustrating the manner in which the corresponding fastener is engaged with a supporting panel of sheet material having an aperture formed therethrough in the conventional manner by means of a drill or punch adapted to remove material from the sheet in the area which is to have the aperture formed therein;

Figure 11:
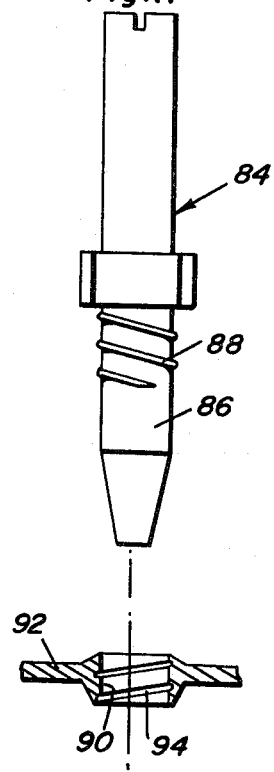
FIGURE 11 is a side elevational view of a further modified form of shank-type drill similar to that illustrated in FIGURE 9 but provided with threads on the upper end portion of the sheet material piercing shank portion thereof.
Figure 12:
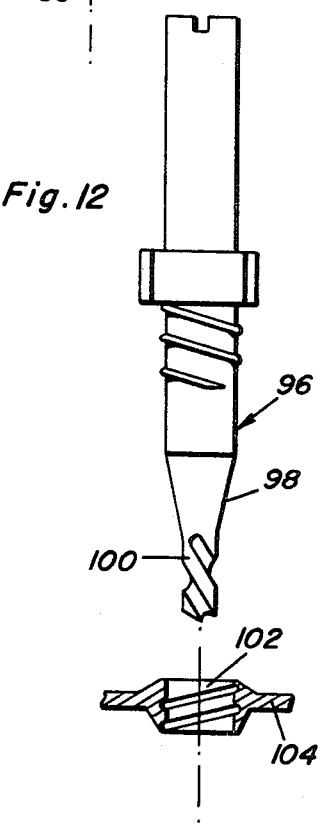
Figure 13:
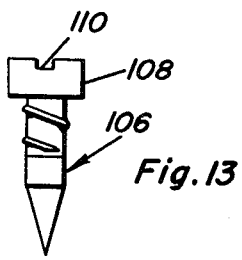

FIGURE 12 is a side elevational view of yet a further modified form of shank-type drill similar to that illustrated in FIGURE 11 of the drawings but including a conventional twist drill lower terminal end portion on its tapered shank portion adapted to initially drill a small diameter aperture in sheet material which is to be enlarged and axially elongated by the tapered shank portion of the drill; and FIGURE 13 is a side elevational view of a threaded type fastener constructed in accordance with the present invention and including a pointed conical tip on its lower end portion disposed below a smooth constant diameter lower shank portion above which is disposed the upper end portion of the shank portion which is externally threaded, the fastener of FIGURE 13 being adapted to be utilized to initially form an elongated aperture in sheet metal, to thread the elongated aperture formed thereby, and to simultaneously secure two sheet metal sections such as those illustrated in FIGURE 7 of the drawings together.

Referring now more specifically to the drawings, the numeral 10 generally designates the improved drill of the instant invention.

In FIGURE 1 of the drawings the drill 10 is shown supported by a conventional chuck illustrated in phantom lines and generally designated by the reference numeral 12 and with the drill 10 positioned above a section 14 of relatively soft material with the section 14 being backed by a suitable apertured backing member 16.

It is to be noted that the apertured backing member 16 does not serve any function in guiding any of the displaced portions of the sheet 14 resulting from a drilling operation by the drill 10 but that the backing member 16 is provided only to prevent excessive deflection of the sheet 14 in the area adjacent to that in which the aperture is to be formed.

The drill 10 includes a first end portion 18 which may be referred to as a base end portion and which is gripped by the chuck or chuck assembly 12. The drill 10 includes a second or work-engaging end portion 20 including a terminal end portion 22 which gradually tapers in diameter toward its free terminal end which is sharply pointed as at 24.

From a comparison of FIGURES 1, 2, and 4 of the drawings it may be seen that the rate at which the tapered terminal end portion 22 tapers diminishes per unit of length of the terminal end portion toward the sharply pointed free terminal end 24. It may be seen that a segment of a cylinder may be disposed tangent to the periphery of the tapered end portion 22 and that the varying rate of diminishing taper of the end portion may be defined by a radius of curvature many times the maximum diameter of the tapered end portion 22. However, there need not be a variance in the rate of taper of the end portion 22. Such a variance is provided only when operating conditions warrant such a slightly modified tapered end portion.

The end of the tapering end portion 22 remote from the pointed terminal end 24 thereof terminates in a constant diameter portion 28. The constant diameter portion 28 in turn terminates in a radially outwardly projecting annular shoulder 30 defined by the adjacent end of a diametrically enlarged end portion of the drill 10 defining the base end 18 thereof.

The shoulder 30 includes a shallow circumferential groove 32 opening toward the pointed terminal end 24 and which is generally semicylindrical in cross-section and curves smoothly outwardly and toward the pointed terminal end 24 from the rear end portion of the constant diameter portion 28.

From FIGURE 5 of the drawings it may be seen that the tapering terminal end portion 22 is substantially circular throughout its entire length. However, from FIGURE 6 of the drawings it may be seen that a modified form of drill generally referred to by the reference numeral 34 includes a tapering terminal end portion 36 which is generally triangular in cross-section.

Many other cross-sectional shapes other than circular and triangular may be utilized in constructing the tapered terminal end portions 22 and 36 of the drills 10 and 34. However, whatever cross-sectional shape is utilized, the tapered terminal end portion should be free of edges thereof which would effect a cutting action on the sheet metal to be apertured in a manner such to remove material from the sheet material in the area thereof which is to be apertured by the drill.

With attention now directed more specifically to FIGURES 1–3 of the drawings it may be seen that the drill 10 is first rotated at high speeds and then advanced against the sheet 14. As soon as the pointed terminal end 24 engages the sheet 14 while rotating at high speeds it will have a tendency to pierce the sheet 14 and laterally outwardly deflect the portions 38 and 40 disposed on the front and rear sides of the sheet 14 in the manner illustrated in FIGURE 2 of the drawings. Then, as the drill 10 is advanced in a manner such that the constant diameter portion 28 is disposed in the resultant aperture 42, the portions 40 of the sheet 14 will appear as illustrated in FIGURE 3 of the drawings appreciably elongating the aperture 42. Likewise, the portions 38 will also have a tendency to elongate the aperture 42. Then, as the shoulder 30 is moved downward into engagement with the portions 38, the latter will be coiled outwardly and downwardly and compacted against the upper or front face 44 of the sheet 14. Thereafter, when a second sheet 46 is secured to the sheet 14 by means of a metal screw 48 or the like passed through a suitable aperture 50 formed in the sheet 46 and secured in the elongated aperture 42 formed in the sheet 14, the threaded shank portion 52 of the fastener 48 will be threadedly engaged with the portion of the sheet 14 defining the aperture 42 throughout a greater portion of its length than a comparable threaded fastener 54 securing the same sheet 46 to a mounting sheet 56 having an aperture 58 formed therein in the conventional manner by the removal of material from the sheet 56 in the area of the aperture 58 resulting in an aperture having an axial length substantially equal to the thickness of the mounting sheet 56. In addition, the coiled and compacted portions 38 will act to slightly dimple the sheet 46 about the aperture 50 formed therein thereby preventing shifting of the panel or sheet 46 relative to the sheet 14.

Figure 9:
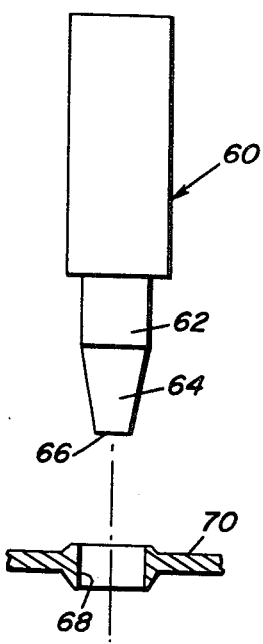
FIGURE 9 is a fragmentary side elevational view of a modified form of shank-type drill similar to the drill illustrated in FIGURES 1–5 but adapted to form a large diameter axially elongated aperture in sheet material and also to enlarge and axially elongate an aperture formed in sheet material by conventional drill methods.

With attention now invited to FIGURE 9 of the drawings there may be seen a modified form of drill generally referred to by the reference numeral 60 and which is substantially identical to the drill 10 except that the work engaging end portion 64 thereof terminates in a lower conical end portion 64 which is truncated and includes a lower end face 66. The drill 60 is adapted to form the axially elongated aperture 68 in the sheet metal panel 70 after a smaller diameter aperture (not shown) is formed in the panel 70 with another tool such as drill 10. Then such a smaller diameter aperture may be enlarged and elongated by means of the drill 60 in the same manner in which the aperture 42 is enlarged and elongated by the drill 10 after the free terminal end 20 of the drill 10 has pierced the sheet 14.

Figure 10:
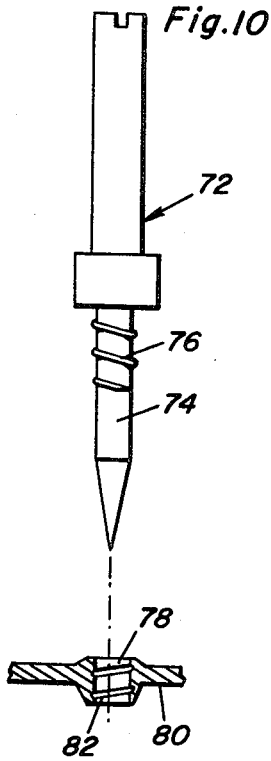
FIGURE 10 is a side elevational view of a further modified form of shank-type drill similar to that illustrated in FIGURE 1 but including external threads on the upper end portion of its sheet metal piercing shank portion adapted to form threads in the elongated aperture formed thereby.

In FIGURE 10 of the drawings there is illustrated another modified form of drill generally referred to by the reference numeral 72 and which comprises a substantial duplicate of the operative portions of the drill 10 except that the upper end portion of the contsant diameter shank portion 74 thereof is externally threaded as at 76 so as to be adapted to form threads in the elongated aperture 78 formed thereby in the sheet 80 as at 82 after the aperture 78 has been formed and has received therein the lower end portion of the constant diameter portion 74.

With attention now directed more specifically to FIGURE 11 of the drawings there may be seen still another modified form of drill generally referred to by the reference numeral 84 and which is substantially identical in construction, as far as the working portions thereof are concerned, to the twist drill 60 except that the constant diameter shank portion 86 thereof is longer than the constant diameter shank portion 62 of the drill 60 and has its upper end portion externally threaded as at 88 in the manner in and for which the upper end portion of the shank portion 74 is externally threaded so as to be adapted to form an enlarged aperture 90 in a sheet metal panel 92 after a small diameter aperture is initially formed therein and to externally thread the enlarged and axially elongated aperture 90 as at 94.

With attention now invited to FIGURE 12 of the drawings there may be seen yet another modified form of drill generally referred to by the reference numeral 96 and which is substantially identical to the drill 84 except that the tapering lower end portion 98 terminates in a terminal end portion 100 in the form of a conventional twist drill whereby the drill 96 may be utilized to initially form a small diameter aperture in a sheet metal panel by conventional drilling methods and then to enlarge and axially lengthen the small diameter aperture prior to forming threads in the resultant enlarged and axially elongated aperture 102 formed in the panel 104.

With attention now directed to FIGURE 13 of the drawings there may be seen yet another modified form of drill generally referred to by the reference numeral 106 and which is very similar in construction to the twist drill 72 but which includes a diametrically enlarged fastener-type head portion 108 provided with a suitable screwdriver kerf 110. The fastener 106 is capable of forming the threaded aperture 78 in a panel or sheet 80 and threadedly engaged with the panel 80 to secure a second panel having a slightly larger diameter aperture formed therein to the panel 80 in very much the same manner in which the panel or sheet 46 is secured to the sheet 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A radius drill comprising an elongated shank member adapted to be rotated about its longitudinal axis and including a first end portion adapted to be gripped in a chuck assembly and a second work-engaging end portion, said second work-engaging end portion including a terminal end portion gradually tapering in diameter toward its free terminal end, said free terminal end being sharply pointed, the cross-sectional shape of said tapering end portion being circular throughout its length and therefore completely free of cutting edges adapted to remove material from a sheet of material through which said tapering end portion is being advanced during rotation of said shank member.

2. The combination of claim 1 wherein the rate at which the diameter of said terminal end portion diminishes per unit of length of said terminal end portion decreases toward said sharply pointed free terminal end.

3. The combination of claim 1 wherein said tapering terminal end portion terminates at its major diameter end in a constant diameter portion of said second end portion of said shank member extending toward said one end portion, said shank member including means defining an annular generally radially outwardly extending shoulder defining the end of said constant diameter portion.

4. The combination of claim 3 wherein the radial face of said shoulder includes a shallow circumferential groove opening toward said terminal end and whose inner peripheral portion is defined by said constant diameter portion.

5. The combination of claim 4 wherein said shoulder extends radially outwardly beyond the radial outermost portion of said groove.

6. The combination of claim 1 wherein said tapering terminal end portion terminates at its major diameter and in a constant diameter portion of said second end portion of said shank member extending toward said one end portion, said shank member including means defining an annular generally radially outwardly extending shoulder defining the end of said constant diameter portion, the rate at which the diameter of said terminal end portion diminishes per unit of length of said terminal end portion decreasing toward said sharply pointed free terminal end.

7. The method of forming an aperture in a sheet of relatively soft metal, said method comprising the uninterrupted succession of steps of initially piercing the sheet in a nonplastic area thereof independent of heating said area sufficient to render the latter appreciably softened to form a small diameter aperture therein, then enlarging said small diameter aperture by simultaneously applying generally perpendicular forces to each portion of the sheet defining said small diameter aperture in generally radially outward and also tangential directions, relative thereto, in a manner displacing at least some of said portions laterally outwardly of both sides of said sheet in areas extending circumferentially about the enlarged aperture thereby appreciably increasing the axial length of said aperture beyond the thickness of said sheet.

8. The method of claim 7 including the step of compacting the laterally outwardly displaced portions of said sheet disposed on one side thereof by applying a force thereon in a direction toward said sheet from said one side thereof.

9. The method of claim 8 wherein the step of compacting is performed while containing the last-mentioned laterally outwardly displaced portions against displacement in the plane of said plate.

10. A radius drill comprising an elongated shank member adapted to be rotated about its longitudinal axis and including a first end portion adapted to be gripped in a chuck assembly and a second work engaging end portion, said second work engaging end portion including a terminal end portion gradually tapering in diameter toward its free terminal end, the cross-sectional shape of said tapering end portion being circular throughout its length and therefore completely free of cutting edges adapted to remove material from a sheet of material through which said tapering end portion is being advanced during rotation of said shank member.

11. The combination of claim 10 wherein said tapering terminal end portion terminates at its major diameter end in a constant diameter portion of said second and portion of said shank member extending toward said one end portion, said shank member including means defining an annular generally radially outwardly extending shoulder defining the end of said constant diameter portion.

12. The combination of claim 11 wherein the radial face of said shoulder includes a shallow circumferential groove opening toward said terminal end and whose inner peripheral portion is defined by said constant diameter portion.

13. The combination of claim 10 wherein said tapering terminal end portion terminates at its major diameter end in a constant diameter portion of said second end portion of said shank member extending toward said one end portion, said shank member including means defining an annular generally radially outwardly extending shoulder defining the end of said constant diameter portion, said constant diameter portion being threaded.

14. The combination of claim 13 wherein said shoulder comprises a diametrically enlarged head portion including specific configuration features adapting said head to be gripped and turned by a hand tool.

15. The combination of claim 10 wherein said tapering terminal end portion terminates at its major diameter end in a constant diameter portion of said second end portion of said shank member extending toward said one end portion, said shank member including means defining an annular generally radially outwardly extending shoulder defining the end of said constant diameter portion, said free terminal end comprising an elongated twist drill forming an extension extending axially of said shank member and adapted to form a first aperture in a piece of sheet work to be subsequently enlarged and axially elongated by said tapering end portion of said shank member.

16. The combination of claim 7 including the final step of forming threads in said enlarged diameter aperture.

17. A radius drill comprising an elongated shank member adapted to be rotated about its longitudinal axis and including a first end portion adapted to be gripped in a chuck assembly and a second work-engaging end portion, said second work-engaging end portion including a terminal end portion gradually tapering in diameter toward its free terminal end, said free terminal end being sharply pointed, the rate at which said second work-engaging end portion tapers gradually diminishing per unit of length toward the sharply pointed free terminal end thereof, said terminal end portion being free of edges thereof capable of effecting a cutting action on a sheet of material through which said terminal end portion is advanced during its rotation.

References Cited

UNITED STATES PATENTS

| | | | |
|---|---|---|---|
| 1,906,953 | 5/1933 | Enghauser. | |
| 2,910,897 | 11/1959 | Huet | 29—157 |
| 382,924 | 5/1888 | Wilcox | 72—364 |
| 1,837,451 | 12/1931 | Lee | 72—325 |
| 2,566,738 | 9/1951 | Mitchell | 83—660 |
| 3,044,341 | 7/1962 | Stern | 77—67 |
| 3,060,562 | 10/1962 | Fransson | 10—152 |
| 3,094,767 | 6/1963 | Grimm | 72—325 |
| 3,094,893 | 6/1963 | Lindstrom | 77—65 |
| 3,238,836 | 3/1966 | Johnson | 77—67 |

FOREIGN PATENTS

| | | |
|---|---|---|
| 570,157 | 8/1958 | Belgium. |
| 583,542 | 9/1933 | Germany. |

CHARLES W. LANHAM, *Primary Examiner.*

E. M. COMBS, *Assistant Examiner.*

U.S. Cl. X.R.

72—377, 464; 77—67